United States Patent
Tseng et al.

(10) Patent No.: US 9,093,914 B2
(45) Date of Patent: Jul. 28, 2015

(54) BOOTSTRAP CIRCUIT AND METHOD FOR CONTROLLING THE SAME

(71) Applicant: RICHTEK TECHNOLOGY CORP., Hsinchu (TW)

(72) Inventors: Pei Kai Tseng, Hsinchu (TW); Chien Fu Tang, Hsinchu (TW); Isaac Y. Chen, Hsinchu (TW)

(73) Assignee: RICHTEK TECHNOLOGY CORP., Hsinchu (TW)

( * ) Notice: Subject to any disclaimer, the term of this patent is extended or adjusted under 35 U.S.C. 154(b) by 357 days.

(21) Appl. No.: 13/871,286

(22) Filed: Apr. 26, 2013

(65) Prior Publication Data

US 2014/0191732 A1     Jul. 10, 2014

(30) Foreign Application Priority Data

Jan. 9, 2013   (TW) .............................. 102100794 A

(51) Int. Cl.
  *H02J 7/00*  (2006.01)
  *H02M 1/36*  (2007.01)
  *H02M 3/07*  (2006.01)
  *H02J 7/34*  (2006.01)

(52) U.S. Cl.
  CPC .............. *H02M 1/36* (2013.01); *H02J 7/0016* (2013.01); *H02M 3/07* (2013.01); *H02J 7/345* (2013.01)

(58) Field of Classification Search
  CPC ............ H02M 1/36; H02M 3/07; H02J 7/00; H02J 7/0016; H02J 7/345
  USPC ........................................................ 320/166
  See application file for complete search history.

(56) References Cited

U.S. PATENT DOCUMENTS

| 3,889,172 | A | * | 6/1975 | Lelaidier et al. | 320/156 |
| RE29,117 | E | * | 1/1977 | Sahajian et al. | 222/649 |
| 5,598,085 | A | * | 1/1997 | Hasler | 320/145 |
| 5,668,705 | A | * | 9/1997 | Balch et al. | 363/21.16 |
| 5,982,604 | A | * | 11/1999 | Kojima et al. | 361/159 |
| 6,060,948 | A | | 5/2000 | Tarantola et al. | |
| 6,075,391 | A | | 6/2000 | Tarantola et al. | |
| 6,807,075 | B2 | * | 10/2004 | Miermans | 363/49 |
| 7,872,447 | B2 | * | 1/2011 | Morita et al. | 320/122 |
| 7,907,376 | B2 | * | 3/2011 | Yamada et al. | 361/92 |
| 8,378,649 | B2 | * | 2/2013 | Moussaoui | 323/271 |
| 8,704,494 | B2 | * | 4/2014 | LoCascio | 320/140 |
| 9,019,726 | B2 | * | 4/2015 | Telefus et al. | 363/21.12 |

* cited by examiner

Primary Examiner — M'baye Diao
(74) Attorney, Agent, or Firm — Chun-Ming Shih

(57) ABSTRACT

A bootstrap circuit includes: a charging voltage source; a charging diode, having an anode coupled to the charging voltage source; a high-voltage transistor, having a control terminal defined as a first connecting node and a channel coupled between a cathode of the charging diode and a bootstrap capacitor; a logic control circuit, having a first and a second logic outputs, and a logic input for receiving a charging command; a high-voltage control transistor, having a control terminal defined as a second connecting node and a channel coupled between charging voltage source and the first connecting node; a cut-off resistor, coupled between the first and the second connecting nodes; a charging control transistor, having a channel coupled between the second connecting node and a ground terminal, and a control terminal coupled to the second logic output; a control capacitor, coupled between the first connecting node and the first logic output.

14 Claims, 4 Drawing Sheets

BOOTSTRAP CIRCUIT AND METHOD FOR CONTROLLING THE SAME

CROSS-REFERENCES TO RELATED APPLICATIONS

This non-provisional application claims priority under 35 U.S.C. §119(a) on Patent Application No. 102100794 filed in Taiwan, R.O.C. on 2013 Jan. 9, the entire contents of which are hereby incorporated by reference.

BACKGROUND

1. Technical Field

This disclosure relates to a bootstrap circuit and a bootstrap method thereof, and more particularly to the bootstrap circuit and the bootstrap method thereof for charging a bootstrap capacitor quickly.

2. Related Art

Voltage converter application such as drive circuits of a motor, ballast, and a cold cathode fluorescent lamp uses an AC or DC voltage source to generate an AC or DC output with a high-voltage or high-current to drive the load. Mainstream conversion circuits use integrated circuit processed by the HV resistant process to achieve the drive stages of power components, so as to drive externally attached power components or ones on the same chip. In additional to power components in the integrated circuit, other associated control circuit will be integrated as well, so as to reduce the size of the application board and the number of external components and to save the cost. However, in order to correctly drive the power components, usually an external bootstrap capacitor will be attached to the application circuit corresponding to bootstrap circuit, so as to achieve high voltage required by the drive stage of the power component. Operationally, the bootstrap circuit has to charge the boot capacitor in a short time. The design uses an integrated high-voltage transistor or other high-voltage resistant component which can be switched to be on or off by the control terminal, such as a laterally diffused metal oxide semiconductor or a bipolar junction transistor, not limited as described herein, to provide a high-voltage and fast charging path, which at the same time is able to prevent abnormal current intrusion, which can be operationally equivalent to a high-voltage resistant diode.

The above power component can forms a half-bridge output stage circuit, which alternatively outputs high voltage and low voltage, so as to output the high-side driver, which includes the above bootstrap circuit, and to form a low impedance path by the bootstrap circuit combined with the high-voltage transistor to fast charge the bootstrap capacitor when the output stage outputs low voltage. When the output stage outputs high voltage, the high-voltage transistor forms a high impedance, so as to prevent bootstrap circuit from intrusion by electric charges in the bootstrap capacitor. In order to effectively achieve the above functions, the high-voltage transistor generally is an N-channel laterally diffused metal oxide semiconductor or an NPN bipolar junction transistor transverse coupled between the bootstrap capacitor and the charging voltage source, and the control terminal (the gate) is coupled to a circuit with a booster function, so as to effectively turn the channel on.

Refer to U.S. Pat. No. 6,060,948; the drawings of the disclosure disclose a bootstrap capacitor C, a high-voltage transistor LD, a diode D1, and a charging voltage source Vs and so on. Assuming that the forward bias is Vd1 when the diode D1 is turned on, then when the high-voltage transistor LD is turned on, the voltage of the control terminal G is 2*Vs−Vd1, and the voltage of the channel is Vs. Therefore, the voltage difference of the control terminal G and the channel is Vs−Vd1. Assuming the threshold voltage of the high-voltage transistor LD is Vth, then the overdrive voltage is Vs−Vd1−Vth. The design should make the overdrive voltage as large as possible in the voltage allowable range, so as to lower the impedance of the high-voltage transistor LD when the channel is turned on and to fast charge the bootstrap capacitor.

Refer to U.S. Pat. No. 6,075,391, the drawings of the disclosure disclose a bootstrap capacitor C, a high-voltage transistor LD, a diode Z1, a diode Z2, and a charging voltage source Vs and so on. Assuming that the forward biases are respectively Vd1 and Vd2 when the diode Z1 and the diode Z2 is turned on, then when the high-voltage transistor LD is turned on, the voltage of the control terminal G is 2*Vs−Vd1, and the voltage of the channel is Vs−Vd2. Therefore the voltage difference of the control terminal G and the channel is Vs−Vd1+Vd2. Assuming the threshold voltage of the high-voltage transistor LD is Vth, then the overdrive voltage is Vs−Vd1+Vd2−Vth. If Vd1 approximately equals Vd2, the overdrive voltage is Vs−Vth. Compared with U.S. Pat. No. 6,060,948; U.S. Pat. No. 6,075,391 has a larger overdrive voltage, which enhances the charging efficiency of the high-voltage transistor LD. Or in the case of the same efficiency, the design of U.S. Pat. No. 6,075,391 will have a smaller chip area needed by integrated high-voltage transistor LD and thus a lower cost. Therefore, we can know from the comparison of these two patents that the efficiency of the high-voltage transistor could be enhanced if new better designs for further increasing the overdrive voltage of the high-voltage transistor are made.

SUMMARY OF THIS DISCLOSURE

In view of the above problems, this disclosure provides a bootstrap circuit and a bootstrap method thereof, so as to charge the bootstrap capacitor faster, or reduce the chip area needed by the bootstrap circuit.

The bootstrap circuit, which applies to a voltage converter and is used for charging a bootstrap capacitor, includes a charging voltage source, a charging diode, a high-voltage transistor, a logic control circuit, a high-voltage control transistor, a cut-off resistor, a charging control transistor, and a control capacitor.

The charging voltage source is used for providing a voltage for charging the bootstrap capacitor. The charging diode has an anode coupled to the charging voltage source. The high-voltage transistor has a channel coupled between a cathode of the charging diode and a bootstrap capacitor and a control terminal switching the channel of the high-voltage transistor to be on or off. The logic control circuit has a logic input, a first logic output, and a second logic output. The logic input is used for receiving a charging command signal, and the charging command signal is used to control the bootstrap circuit whether to charge the bootstrap capacitor by the bootstrap circuit. The first logic output is used to output a signal non-inverting with the signal in the logic input, and the second logic output is used to output a signal inverting with the signal in the logic input. The high-voltage control transistor has a control terminal and a channel coupled between the charging voltage source and the control terminal of the high-voltage transistor. The cut-off resistor is coupled between the control terminals of the high-voltage transistor and the high-voltage control transistor. The charging control transistor has a channel coupled between the control terminal of the high-voltage control transistor and a ground terminal and a control terminal coupled to the second logic output. The control capacitor is coupled between the control terminal of the high-voltage transistor and the first logic output.

This disclosure also provides a bootstrap method, which applies to a bootstrap circuit of a voltage converter and is used for charging a bootstrap capacitor, includes the steps of:

receiving a charging command signal by the bootstrap circuit, wherein the charging command signal is used to control the bootstrap circuit whether to charge a bootstrap capacitor;

when the charging command signal controls the bootstrap circuit to charge the bootstrap capacitor, forming a charging path for the bootstrap capacitor by using a high-voltage transistor, so as to charge the bootstrap capacitor by a charging voltage source, and then returning to the step of receiving a charging command signal by the bootstrap circuit; and when the charging command signal controls the bootstrap circuit not to charge the bootstrap capacitor, form a charging path for a control capacitor using a high-voltage control transistor, so as to charge the control capacitor coupled to a control terminal of the high-voltage transistor by the charging voltage source, and then returning to the step of receiving a charging command signal by the bootstrap circuit.

By using a field-effect transistor to replace the diode of the prior art, users charge the control capacitor coupled to the control terminal of the high-voltage transistor, such that the high-voltage transistor will form a charging path with a higher overdrive voltage. Therefore, the bootstrap circuit is able to charge the bootstrap capacitor faster or to reduce the size of the high-voltage transistor, so as to reduce the chip area needed for the integrated high-voltage transistor and to lower the cost.

The detail of this disclosure can be better appreciated from the following detailed description of this disclosure, taken in conjunction with the attached drawings.

BRIEF DESCRIPTION OF THE DRAWINGS

This disclosure will become more fully understood from the detailed description given herein below for illustration only, and thus not limitative of this disclosure, wherein.

DETAILED DESCRIPTION OF THE DISCLOSURE

Figure 1:
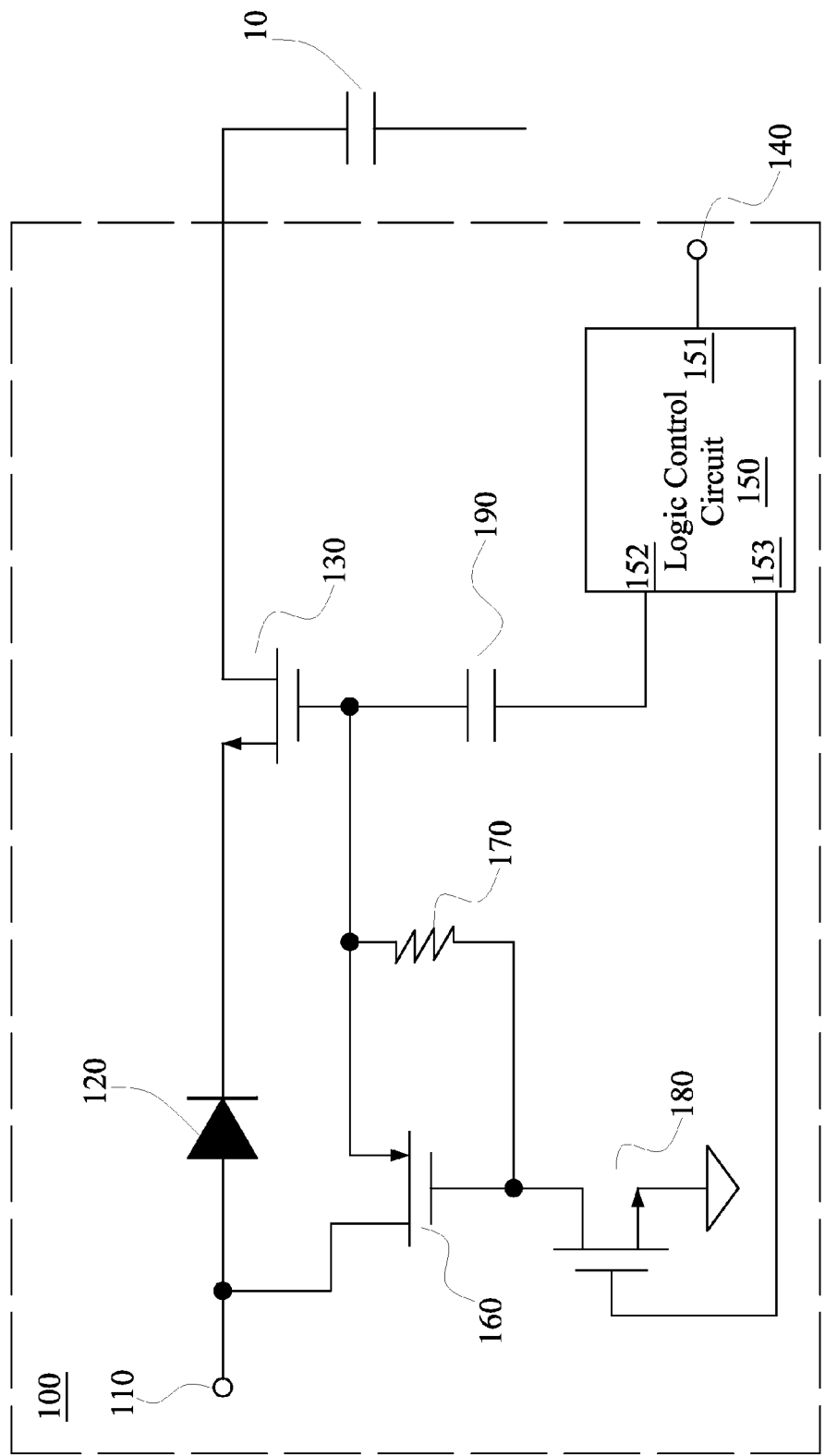
FIG. 1 is a circuit diagram of the bootstrap circuit according to a first embodiment.

Refer to FIG. 1, a bootstrap circuit 100 applies to a voltage converter and is used for charging a bootstrap capacitor. The bootstrap circuit 100 includes a charging voltage source 110, a charging diode 120, a high-voltage transistor 130, a logic control circuit 150, a high-voltage control transistor 160, a cut-off resistor 170, a charging control transistor 180, and a control capacitor 190.

The charging voltage source 110 is used for provide a voltage for charging the bootstrap capacitor 10. The charging diode 120 has an anode coupled to the charging voltage source 110. The charging diode 120 could be a common diode or a Zener diode, not limited as described herein. When the channel of the high-voltage transistor 130 is turned on and when the voltage of the bootstrap capacitor 10 is higher than that of the charging voltage source 110, the charging diode 120 is used to isolate the voltage of the bootstrap capacitor 10 from that of the charging voltage source 110 and the circuit coupled to the charging voltage source 110, so as to protect the bootstrap circuit 100. The high-voltage transistor 130 has a channel coupled between a cathode of the charging diode 120 and the bootstrap capacitor 10 and a control terminal switching the channel of the high-voltage transistor 130 to be on or off. The high-voltage transistor 130 could be an N-channel laterally diffused metal oxide semiconductor or an NPN bipolar junction transistor, not limited as described herein.

The logic control circuit 150 has a logic input 151, a first logic output 152, and a second logic output 153. The logic input 151 is used for receiving a charging command signal 140, and the charging command signal 140 is used to control the bootstrap circuit 100 whether to charge the bootstrap capacitor 190 by the bootstrap circuit 100. The first logic output 152 is used to output a signal non-inverting with the signal in the logic input 151, and the second logic output 153 is used to output a signal inverting with the signal in the logic input 151.

The high-voltage control transistor 160 has a control terminal and a channel coupled between the charging voltage source 110 and the control terminal of the high-voltage transistor 130. The high-voltage control transistor 160 could be a P-channel metal-oxide-semiconductor field-effect transistor, not limited as described herein. The cut-off resistor 170 is coupled between the control terminal of the high-voltage transistor 130 and the control terminal of the high-voltage control transistor 160. The charging control transistor 180 has a channel coupled between the control terminal of the high-voltage control transistor 160 and a ground terminal and a control terminal coupled to the second logic output 153. The charging control transistor 180 could be an N-channel metal-oxide-semiconductor field-effect transistor, not limited as described herein. The control capacitor 190 is coupled between the control terminal of the high-voltage transistor 130 and the first logic output 152.

The operation of the bootstrap circuit 100 is described hereinafter. The bootstrap circuit 100 applies to a voltage converter, and the voltage converter includes a high-side driver and a low-side driver. The a high-side driver and the low-side driver respectively provide the high voltage component and the low voltage component of the outputting signal, so as to form an output signal with pulse-width modulation. The control capacitor 190 is used for providing the high voltage required for the high voltage drive stage, so as to drive the power component. The charging command signal 140 is a signal linked with the operation of the low voltage drive stage, that is, when the low voltage drive stage is activated, the charging command signal 140 is emitted as well to command the bootstrap circuit 100 to form a charging path for a bootstrap capacitor and to charge the bootstrap capacitor. Otherwise, cut off the charging path for the bootstrap capacitor, that is, not to charge the bootstrap capacitor.

Furthermore, when the charging command signal 140 is a digital signal 0 to control the bootstrap circuit 100 not to charge the bootstrap capacitor 10, the first logic output 152 outputs a digital signal 0, and the second logic output 153 outputs a digital signal 1. At this time, the channel of the charging control transistor 180 is turned on, and the control terminal of high-voltage control transistor 160 is coupled to the ground terminal, that is, 0 volt. Because the high-voltage control transistor 160 is a P-channel metal-oxide-semiconductor field-effect transistor, the channel thereof is turned on and forms a charging path for the control capacitor, so as to charge the control capacitor 190 by the charging voltage source. If the voltages of the charging voltage source 110 and the digital signal 1 are both VCC and the voltage of the digital signal 0 is 0 volt, the control capacitor 190 will be charged to VCC. In the operation of the voltage converter, if the voltage of the bootstrap capacitor 10 is higher than VCC, and the voltage of the control terminal of the high-voltage transistor 130, that is, the gate, VG is VCC, the channel should be turned off. If some mistakes happen at this time, such that the channel of the high-voltage transistor 130 is turned on, with the condition that the charging diode 120 has a forward bias VZD, the voltage of the source of the high-voltage transistor 130 VS is VCC−VZD. Assuming that the threshold voltage of the high-voltage transistor 130 is VTH, if the inequality is satisfied, the high-voltage transistor 130 is impossible to be turned on:

$$VTH > VG - VS = VCC - (VCC - VZD) = VZD \quad (1)$$

For example, if VTH is 1 volt and VZD is 0.7 volt, the inequality is satisfied, and the high-voltage transistor 130 can not be turned on.

On the other hands, when the charging command signal 140 is a digital signal 1, so as to control the bootstrap circuit 100 to charge the bootstrap capacitor 10, the first logic output 152 outputs a digital signal 1, and the second logic output 153 outputs a digital signal 0. Because the voltage of the control capacitor 190 is VCC and the voltage of the first logic output 152 is VCC, the voltage of the control terminal of high-voltage transistor 130 will be 2*VCC, and the channel thereof is turned on and forms a charging path for the bootstrap capacitor 10, so as to charge the bootstrap capacitor 10 via charging voltage source 110 passing through the charging diode 120. At this time, because the channel of the charging control transistor 180 is cut off, the control terminal of the high-voltage control transistor 160 is coupled to the control terminal of the high-voltage transistor 130 via the cut-off resistor 170, and the voltage of the control terminal of the high-voltage control transistor 160 is 2*VCC. Because one end of the channel of the high-voltage control transistor 160 is coupled to the charging voltage source 110, the channel of the high-voltage control transistor 160 is cut off, so as to prevent leakage of the control capacitor through the high-voltage control transistor 160, that is, the channel of the high-voltage control transistor 160 is cut off by the cut-off resistor 170. Besides, because the voltage of the gate of the high-voltage transistor 130 is 2*VCC and the voltage of the source VS is formed by the charging voltage source 110 passing through a charging diode 120 with a forward bias, that is, VS is VCC−VZD, the overdrive voltage Vod is described below:

$$Vod = 2*VCC - (VCC - VZD) = VCC + VZD \quad (2)$$

Compared with the bootstrap circuits in the art, the bootstrap circuit 100 of this disclosure has a larger overdrive voltage, so as to lower the impedance of the channel of high-voltage transistor 130 and to charge the bootstrap capacitor 10 faster. On the other hands, when the charging efficiency is the same with that in the former cases, the size of the high-voltage transistor 130 is reduced, such that the chip area needed by the integrated high-voltage transistor 130 is reduced and that the cost is lowered.

Figure 2:
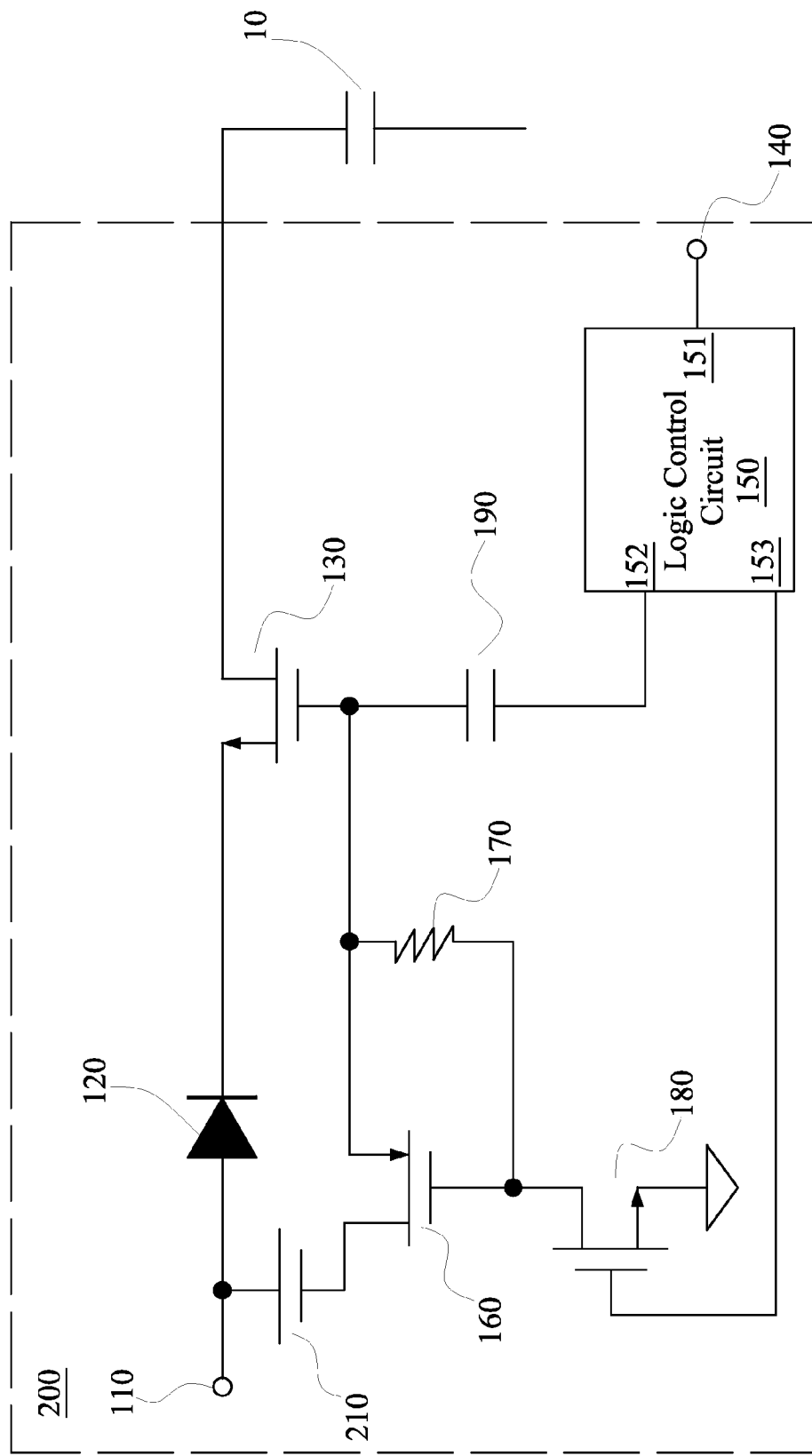
FIG. 2 is a circuit diagram of the bootstrap circuit according to a second embodiment.

Refer to FIG. 2, a bootstrap circuit 200 according to the second embodiment is provided. The difference between the first and the second embodiments is that a voltage fixing component 210 is coupled between the charging voltage source 110 and the channel of the high-voltage control transistor 160, such that the voltage of the channel of the high-voltage control transistor 160 is lower than the voltage of the charging voltage source 110. The operation of the bootstrap circuit 200 according to the second embodiment is same as that of the bootstrap circuit 100 according to the first embodiment, and the detailed description will not repeat hereinafter. The only difference is that the added voltage fixing component 210 makes the behavior of the high-voltage transistor 130 different when the channel thereof is on or off. The inventor will describe it below.

Assuming the voltage of the voltage fixing component 210 is Vdrop, when the charging command signal commands the bootstrap circuit 100 not to charge the bootstrap capacitor 10 and the channel of the high-voltage transistor 130 is cut off, the inequality should be satisfied:

$$VTH > VG - VS = (VCC - V\text{drop}) - (VCC - VZD) = VZD - V\text{drop} \quad (3)$$

We can find out that the inequality (3) is easier to be satisfied than the inequality (1). Therefore, when the bootstrap circuit operates in an environment with higher noses, the channel of the high-voltage transistor 130 will be cut off easier, for avoiding leakage of the bootstrap capacitor 10 due to the wrong behavior of the channel of the high-voltage transistor 130. Besides, the voltage of VG−VS is smaller, so that the cut-off leakage current of the channel of the high-voltage transistor 130 is smaller.

On the other hands, when the charging command signal 140 commands the bootstrap circuit 100 to charge the bootstrap capacitor 10 and the channel of the high-voltage transistor 130 is on, the overdrive voltage Vod is:

$$Vod = (2*VCC - V\text{drop}) - (VCC - VZD) = VCC + VZD - V\text{drop} \quad (4)$$

Comparing equation (4) with (2), because of the voltage fixing component 210, we can find that the overdrive voltage is reduced by Vdrop. Therefore, it's a choice between the channel cut-off efficiency and channel conduction efficiency in design.

The voltage fixing component 210 could be a general diode, a Zener diode, a laterally diffused metal oxide semiconductor coupled in a diode manner, or a bipolar junction transistor coupled in a diode manner, not limited as described herein. The main function of voltage fixing component is that when the charging path for the control capacitor are formed, forming a voltage difference between the charging voltage source and the channel of the high-voltage control transistor. People having ordinary skill in the art can make proper modification to the voltage fixing component 210 according to the actual needs or design requirements, not limited as described herein.

Figure 3:
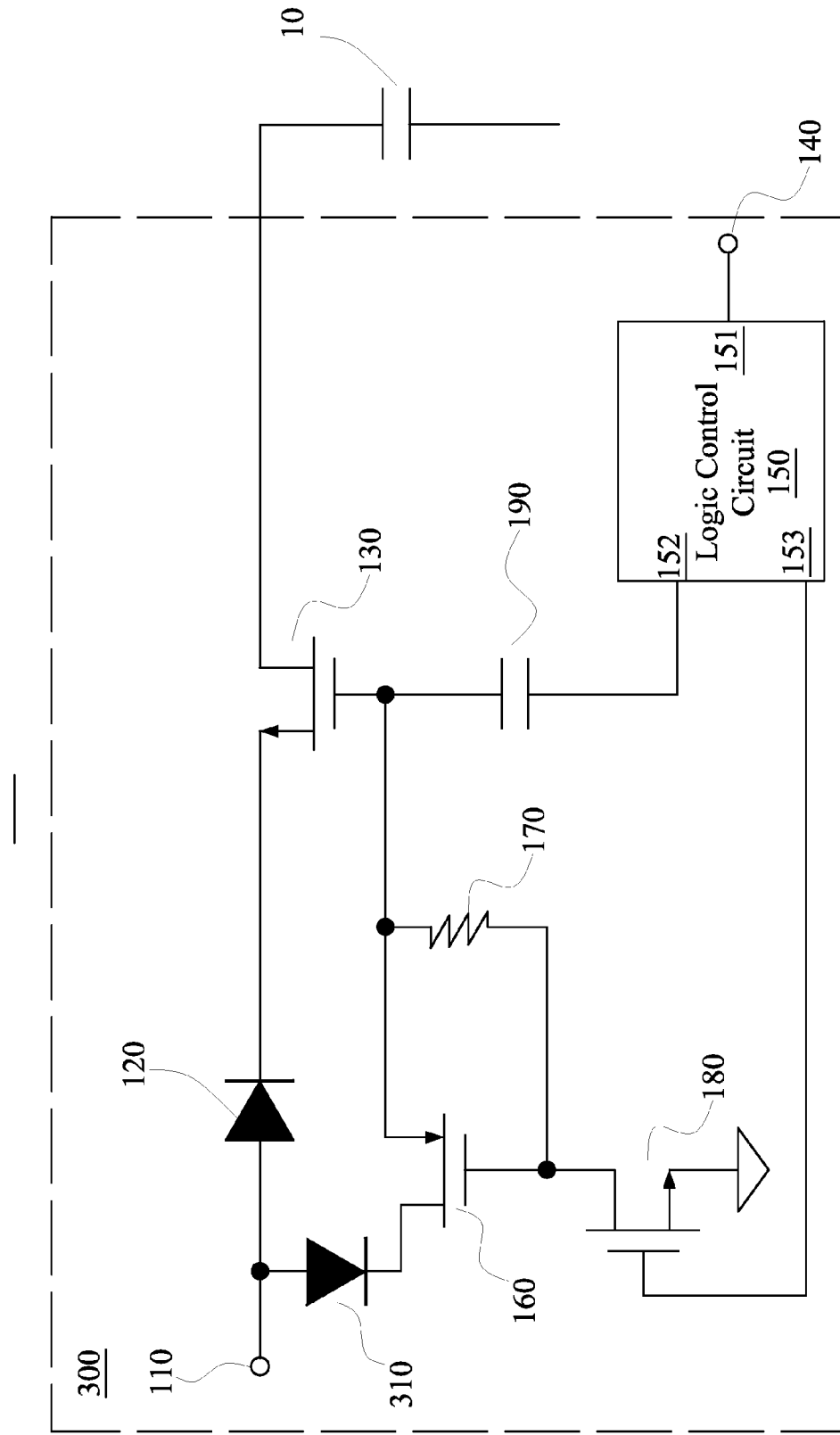
FIG. 3 is a circuit diagram of the bootstrap circuit according to a third embodiment.

Refer to FIG. 3, a bootstrap circuit 300 according to the third embodiment is provided. A specific component, that is, a voltage-drop diode 310, is used as the voltage fixing component 210 in the second embodiment, so that the forward bias is VD. The operation and function of the bootstrap circuit 300 is not different from the bootstrap circuit 200. We can understand the behavior by replacing the Vdrop by VD in equations (3) and (4). These three embodiments are used for illustration, not to limit this disclosure. People having ordinary skill in the art can make proper modification to these three embodiments according to the actual needs or design requirements, not limited as described herein.

Figure 4:
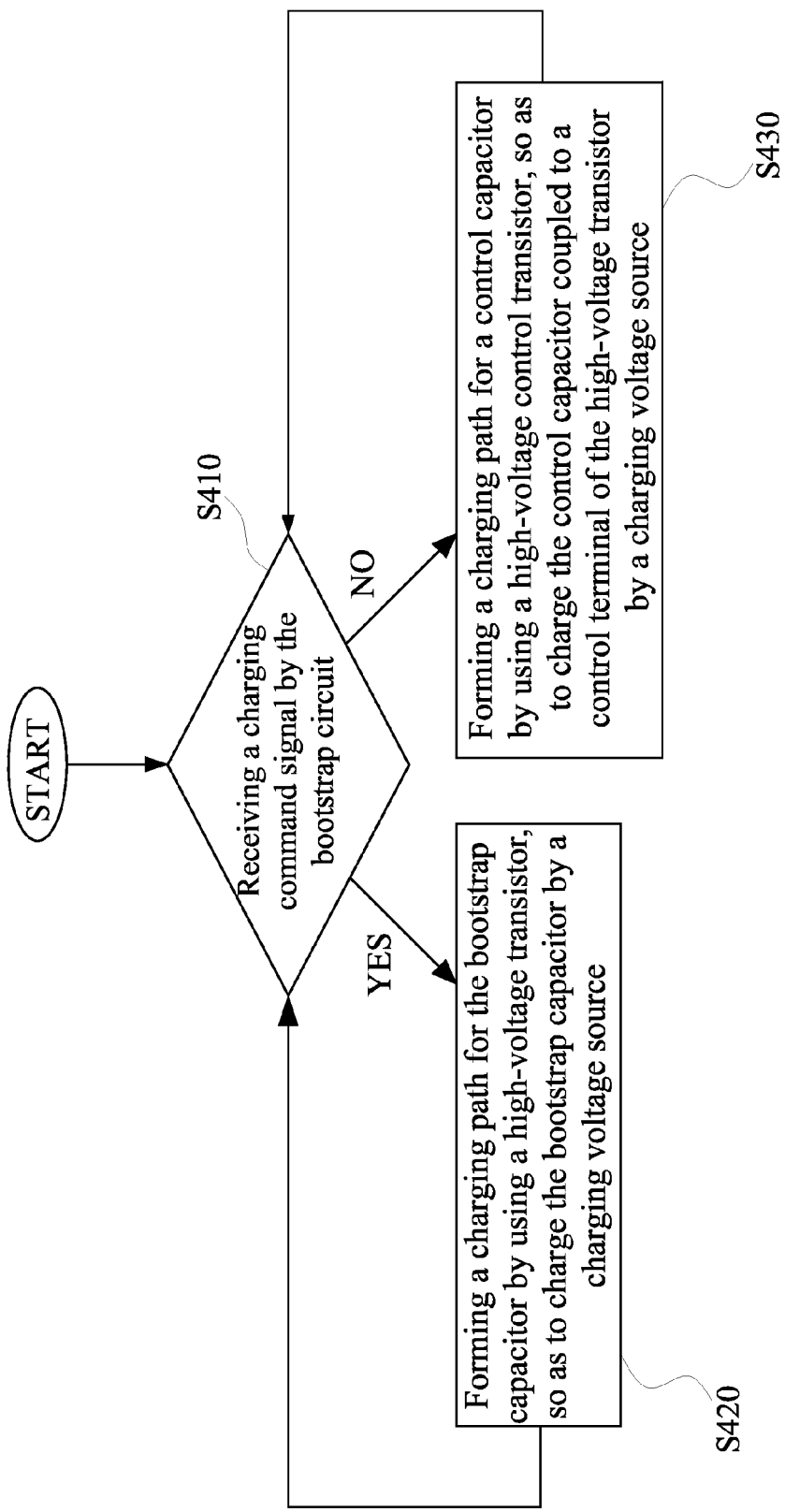
FIG. 4 is a flow diagram of the bootstrap method.

Refer to FIG. 4, a bootstrap method, which applies to a bootstrap circuit of a voltage converter and is used for charging a bootstrap capacitor, includes the steps of:

receiving a charging command signal by the bootstrap circuit, wherein the charging command signal is used to control the bootstrap circuit whether to charge the bootstrap capacitor (S410);

when the charging command signal controls the bootstrap capacitor to charge, forming a charging path for the bootstrap capacitor by using a high-voltage transistor, so as to charge the bootstrap capacitor by a charging voltage source, and then returning to step 410 (S420); and when the charging command signal controls the bootstrap capacitor not to charge, forming a charging path for a control capacitor by using a high-voltage control transistor, so as to charge the control capacitor coupled to a control terminal of the high-voltage transistor by a charging voltage source, and then returning to step 410 (S430).

In one or more embodiment, Step 420 further includes steps of connecting a charging diode and the high-voltage transistor in series to form the charging path for the bootstrap capacitor, which is used to isolate the voltage of the charging capacitor from the charging voltage source and from the circuit coupled with the charging voltage source if the voltage of the charging capacitor is higher than the voltage of the charging voltage source.

In one or more embodiment, Step 420 further includes steps of using a cut-off resistor coupled between a control terminal of the high-voltage control transistor and one end of a channel of the high-voltage control transistor, so as to cut off the channel of the high-voltage control transistor.

In one or more embodiment, Step 430 further includes steps of connecting a voltage fixing component and the high-voltage control transistor in series to form the charging path for the control capacitor, so as to cut off the high-voltage control transistor more effectively.

In one or more embodiment, Step 430 further includes steps of connecting a voltage-drop diode and the high-voltage control transistor in series to form a charging path for the control capacitor, so as to cut off the high-voltage transistor more effectively.

By using a field-effect transistors to replace the diode of the prior art, users charge the control capacitor coupled to the control terminal of the high-voltage transistor, such that the high-voltage transistor will form a charging path with a higher overdrive voltage. Therefore, the bootstrap circuit is able to charge the bootstrap capacitor faster or to reduce the size of the high-voltage transistor, so as to reduce the chip area needed for the integrated high-voltage transistor and to lower the cost.

Though the embodiments of this disclosure are disclosed as described above, this is not to limit this disclosure. People having ordinary skill in the art will recognize that this disclosure can be practiced with modification within the spirit and scope of the claim. It is therefore to be understood that this disclosure is not to be limited by the foregoing description but only by the appended claims.

What is claimed is:

1. A bootstrap circuit, applying to a voltage converter, for charging a bootstrap capacitor, comprising:
    a charging voltage source;
    a charging diode, including an anode coupled to the charging voltage source;
    a high-voltage transistor, including a channel coupled between a cathode of the charging diode and a bootstrap capacitor, and a control terminal switching the channel of the high-voltage transistor to be on or off;
    a logic control circuit, including a logic input, a first logic output, and a second logic output, wherein the logic input is used for receiving a charging command signal, the charging command signal is used to control the bootstrap circuit whether to charge the bootstrap capacitor by the bootstrap circuit, the first logic output is used to output a signal non-inverting with the signal in the logic input, the second logic output is used to output a signal inverting with the signal in the logic input;
    a high-voltage control transistor, having a control terminal and a channel coupled between the charging voltage source and the control terminal of the high-voltage transistor;
    a cut-off resistor, coupled between the control terminal of the high-voltage transistor and the control terminal of the high-voltage control transistor;
    a charging control transistor, including a channel coupled between the control terminal of the high-voltage control transistor and a ground terminal and a control terminal coupled to the second logic output; and
    a control capacitor, coupled between the control terminal of the high-voltage transistor and the first logic output.

2. The bootstrap circuit as claimed in claim 1, wherein the high-voltage transistor is an N-channel laterally diffused metal oxide semiconductor or an NPN bipolar junction transistor, and the high-voltage control transistor is a P-channel metal-oxide-semiconductor field-effect transistor.

3. The bootstrap circuit as claimed in claim 1, wherein the charging diode is a Zener diode.

4. The bootstrap circuit as claimed in claim 1, wherein the channel of the high-voltage control transistor is coupled to the charging voltage source via a voltage fixing component.

5. The bootstrap circuit as claimed in claim 4, wherein the high-voltage transistor is an N-channel laterally diffused metal oxide semiconductor or an NPN bipolar junction transistor, and the high-voltage control transistor is a P-channel metal-oxide-semiconductor field-effect transistor.

6. The bootstrap circuit as claimed in claim 4, wherein the charging diode is a Zener diode.

7. The bootstrap circuit as claimed in claim 1, wherein the channel of the high-voltage control transistor is coupled to the charging voltage source via a voltage-drop diode, the anode of the voltage-drop diode is coupled to the charging voltage source; the cathode of the voltage-drop diode is coupled to the channel of the high-voltage control transistor.

8. The bootstrap circuit as claimed in claim 7, wherein the high-voltage transistor is an N-channel laterally diffused metal oxide semiconductor or an NPN bipolar junction transistor, and the high-voltage control transistor is a P-channel metal-oxide-semiconductor field-effect transistor.

9. The bootstrap circuit as claimed in claim 7, wherein the charging diode is a Zener diode.

10. A bootstrap method, applying to a bootstrap circuit of a voltage converter, for charging a bootstrap capacitor, comprising:
    receiving a charging command signal by the bootstrap circuit, wherein the charging command signal is used to control the bootstrap circuit whether to charge the bootstrap capacitor;
    when the charging command signal controls the bootstrap circuit to charge the bootstrap capacitor, forming a charging path for the bootstrap capacitor by using a high-voltage transistor, charging the bootstrap capacitor by a charging voltage source, and returning to the step of receiving a charging command signal by the bootstrap circuit; and
    when the charging command signal controls the bootstrap circuit not to charge the bootstrap capacitor, forming a charging path for a control capacitor by using a high-voltage control transistor, charging the control capacitor coupled to a control terminal of the high-voltage transistor by the charging voltage source, and returning to the step of receiving a charging command signal by the bootstrap circuit.

11. The bootstrap method as claimed in claim 10, wherein the step of the charging command signal controls the bootstrap circuit to charge the bootstrap capacitor further includes:
  connecting a charging diode and the high-voltage transistor in series to form the charging path for the bootstrap capacitor, so as to isolate the voltage of the charging capacitor from the charging voltage source and from the circuit coupled with the charging voltage source if the voltage of the charging capacitor is higher than the voltage of the charging voltage source.

12. The bootstrap method as claimed in claim 10, wherein the step of the charging command signal controls the bootstrap circuit to charge the bootstrap capacitor further includes using a cut-off resistor coupled between a control terminal of the high-voltage control transistor and one end of a channel of the high-voltage control transistor, so as to cut off the channel of the high-voltage control transistor.

13. The bootstrap method as claimed in claim 10, wherein the step of the charging command signal controls the bootstrap circuit not to charge the bootstrap capacitor further includes connecting a voltage fixing component and the high-voltage control transistor in series to form the charging path for the control capacitor, so as to cut off the high-voltage transistor more effectively.

14. The bootstrap method as claimed in claim 10, wherein the step of the charging command signal controls the bootstrap circuit not to charge the bootstrap capacitor further includes connecting a voltage-drop diode and the high-voltage control transistor in series to form the charging path for the control capacitor, so as to cut off the high-voltage transistor more effectively.

* * * * *